US011875017B2

(12) United States Patent
Imam et al.

(10) Patent No.: US 11,875,017 B2
(45) Date of Patent: Jan. 16, 2024

(54) INTELLIGENT ADJUSTMENT OF DOCUMENTS VIA MACHINE LEARNING

(71) Applicant: SAP SE, Walldorf (DE)

(72) Inventors: Mohd Danish Imam, Bellary (IN); Ajay Krishna Uniyal, Kumalda (IN); Shivendra Kumar Mathur, Bangalore (IN); Kumar Priyam, Bellary (IN); Harish Sivakumaran, Bellary (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/746,003

(22) Filed: May 17, 2022

(65) Prior Publication Data
US 2023/0376167 A1 Nov. 23, 2023

(51) Int. Cl.
G06F 40/166 (2020.01)
G06F 3/0482 (2013.01)
G06F 16/93 (2019.01)
G06F 40/106 (2020.01)

(52) U.S. Cl.
CPC ............ *G06F 3/0482* (2013.01); *G06F 16/94* (2019.01); *G06F 40/106* (2020.01); *G06F 40/166* (2020.01)

(58) Field of Classification Search
CPC ...... G06F 3/0482; G06F 16/94; G06F 40/166; G06F 40/10; G06F 40/16; G06N 20/00; G06N 3/02
See application file for complete search history.

(56) References Cited

U.S. PATENT DOCUMENTS

| 7,027,931 | B1* | 4/2006 | Jones | G16B 50/30 422/50 |
| 9,892,106 | B1* | 2/2018 | Lesner | G06Q 50/26 |
| 2013/0144605 | A1* | 6/2013 | Brager | G06F 16/30 704/9 |
| 2020/0097846 | A1* | 3/2020 | Muramoto | G06N 99/00 |
| 2020/0202300 | A1* | 6/2020 | Agarwal | G06F 16/176 |
| 2020/0226646 | A1* | 7/2020 | Awoyemi | G06F 16/313 |
| 2021/0263900 | A1* | 8/2021 | Joyce | G06F 16/2228 |
| 2022/0043964 | A1* | 2/2022 | Stenerson | G06F 3/0481 |
| 2022/0237620 | A1* | 7/2022 | Saarenvirta | G06Q 20/4016 |
| 2023/0052619 | A1* | 2/2023 | Kaveti | G06Q 30/04 |
| 2023/0214579 | A1* | 7/2023 | Somech | G06N 3/0455 715/271 |
| 2023/0237822 | A1* | 7/2023 | Sharma | G06F 40/166 382/159 |

* cited by examiner

*Primary Examiner* — Dino Kujundzic
(74) *Attorney, Agent, or Firm* — Buckley, Maschoff & Talwalkar LLC

(57) ABSTRACT

Provided are a system and method that use machine learning to recommend adjustments to digital documents that are included within a report managed by a software application. The system may also provide a trend analysis as part of the recommendation. In one example, the method may include detecting a request to open a digital document from a user via a user interface, populating the user interface with content from the digital document and executing a machine learning model on values within the digital document to identify a value among the values that is to be adjusted to a different value based on previous adjustments by the user to previous reports, activating a user interface element associated with the identified value within the user interface, and in response to a selection of the user interface element, instantiating a display of the different value on the user interface.

17 Claims, 12 Drawing Sheets

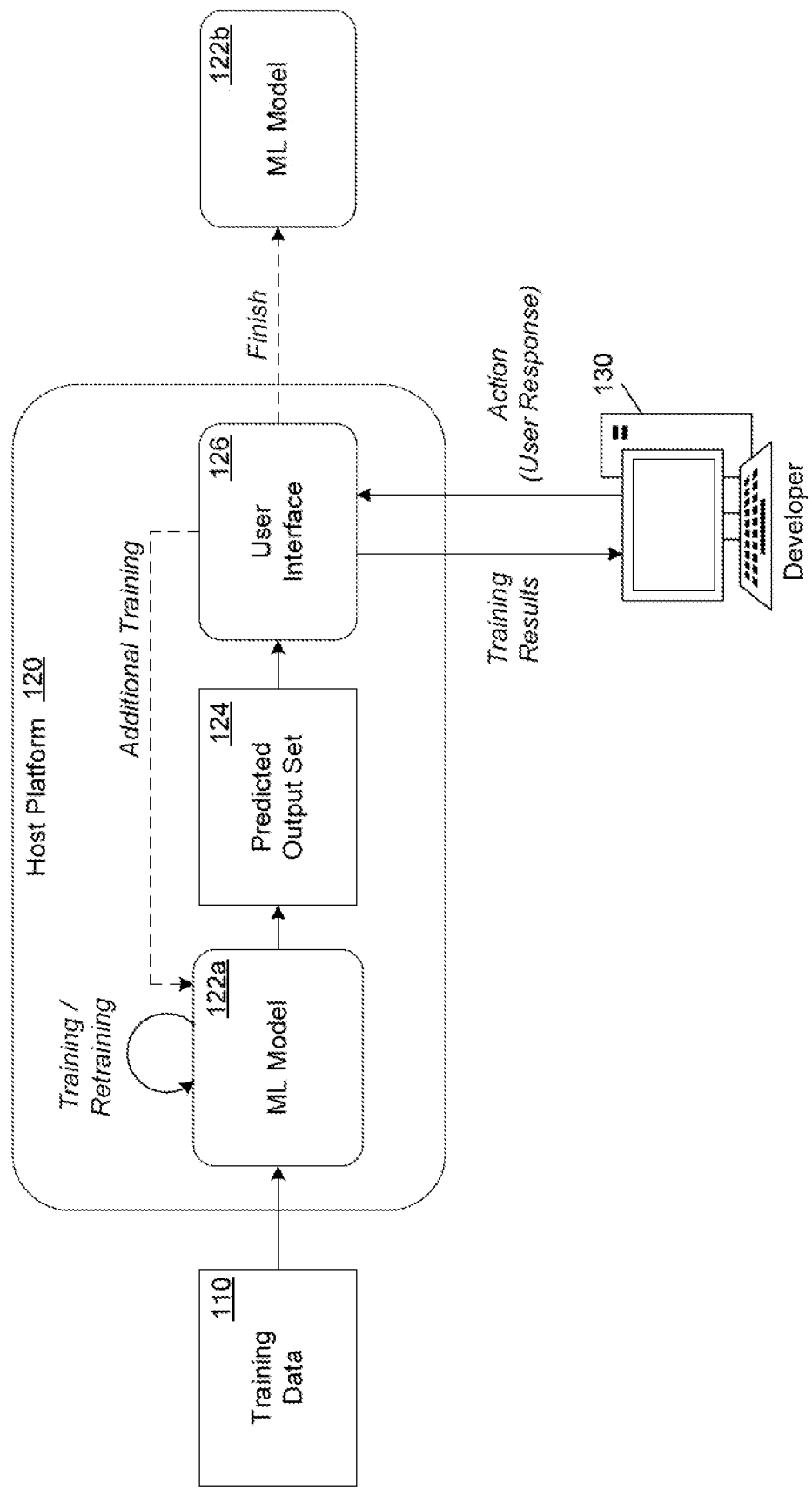

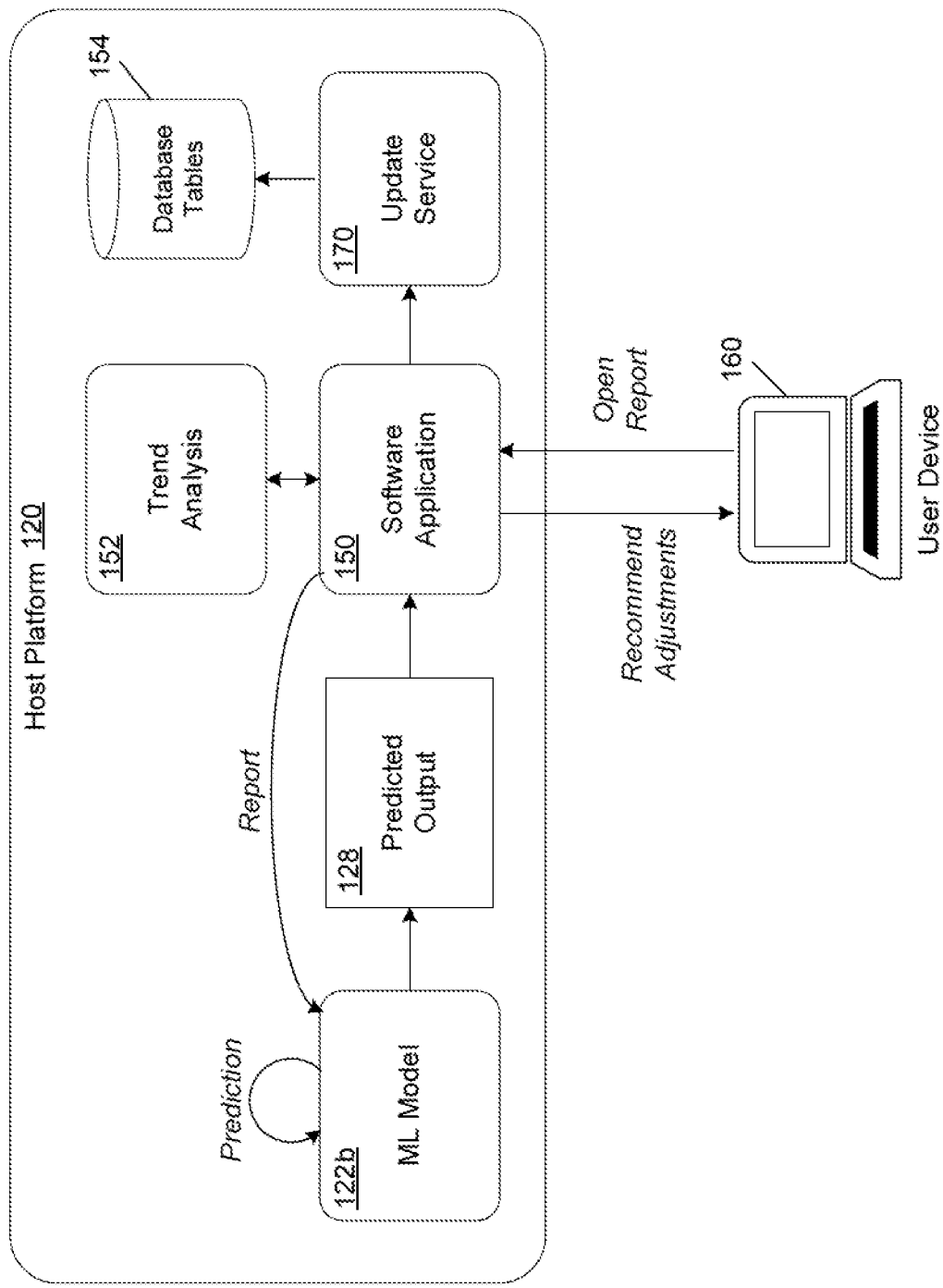

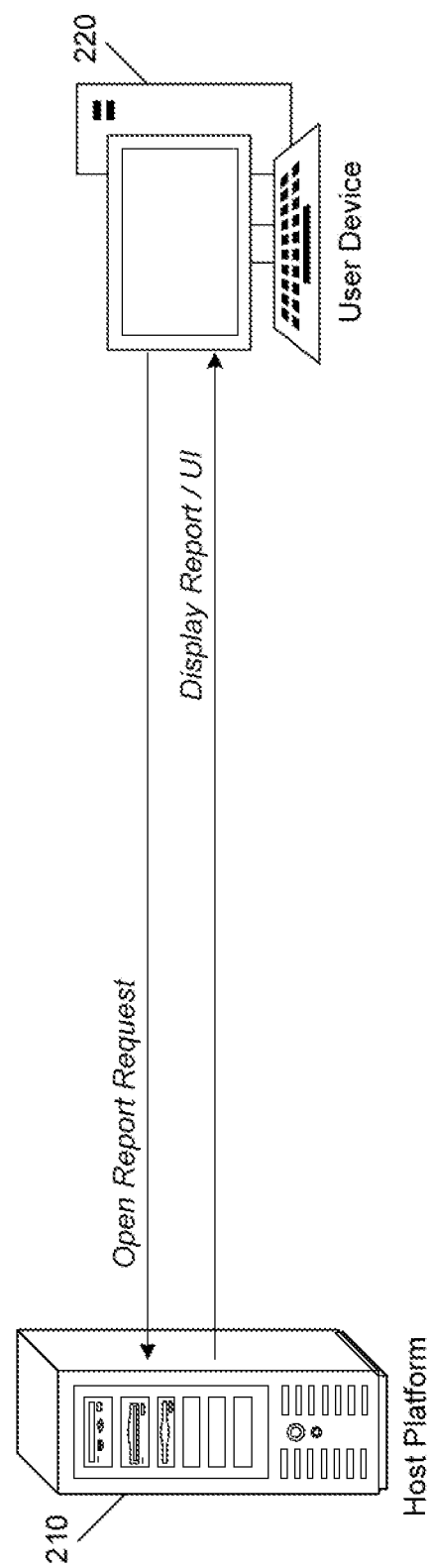

| Activity Name | Due Date | Status | Last Modified By | Last Modified On |
|---|---|---|---|---|
| ☐ Manage Tax Items | April 30 | Completed | User_9 | April 4 |
| ☑ VAT Summary | April 30 | In Process | User_4 | April 21 |
| ☐ Post Tax Payable | April 30 | Not Started | | |
| ⋮ | ⋮ | ⋮ | | |

230

232

234

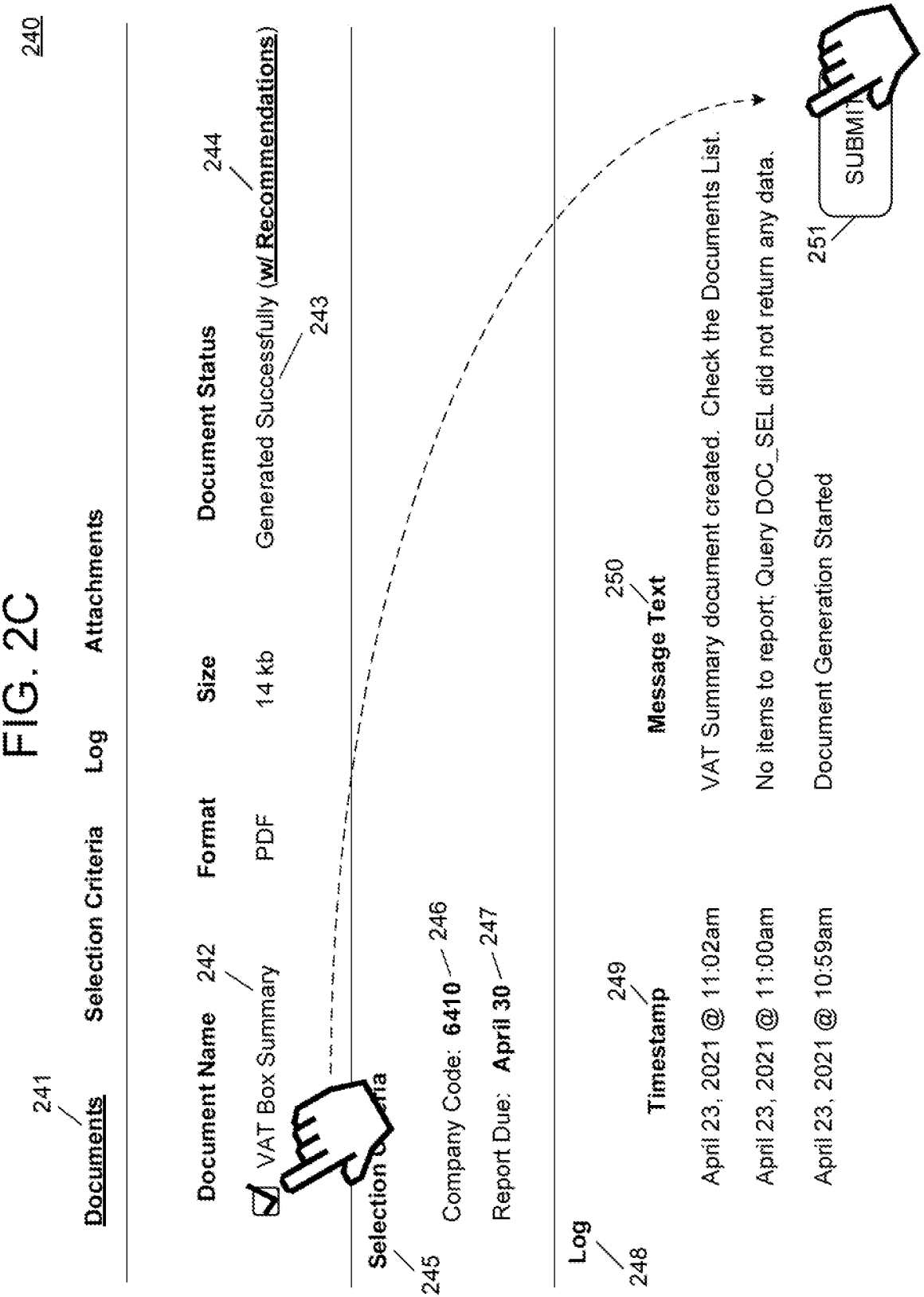

Document Name: VAT Box Summary

261 — Username: User_268 — 262

Phone Number: (440) 123-3020

Email: username@company.com

Net Income: $424,545 — 263

Tax Amount: $87,905 — 264

Zero Rate: $424,545

Exemptions: $33,526

Acommodation: $220,344

Rate: $60

265 — Save / Regenerate

Cancel — 266

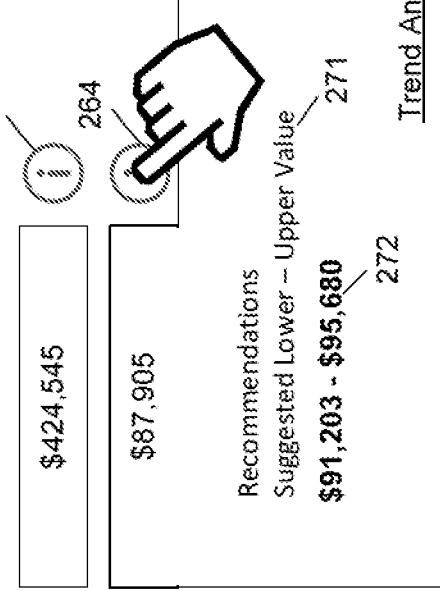

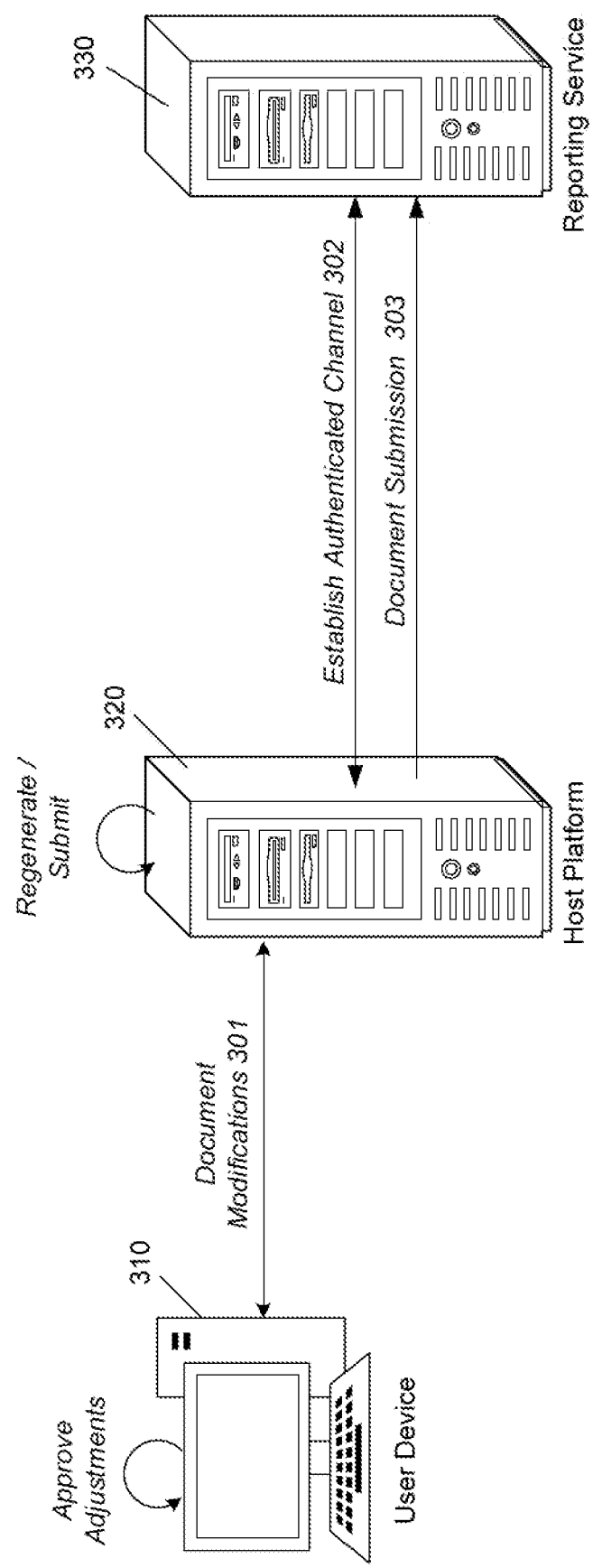

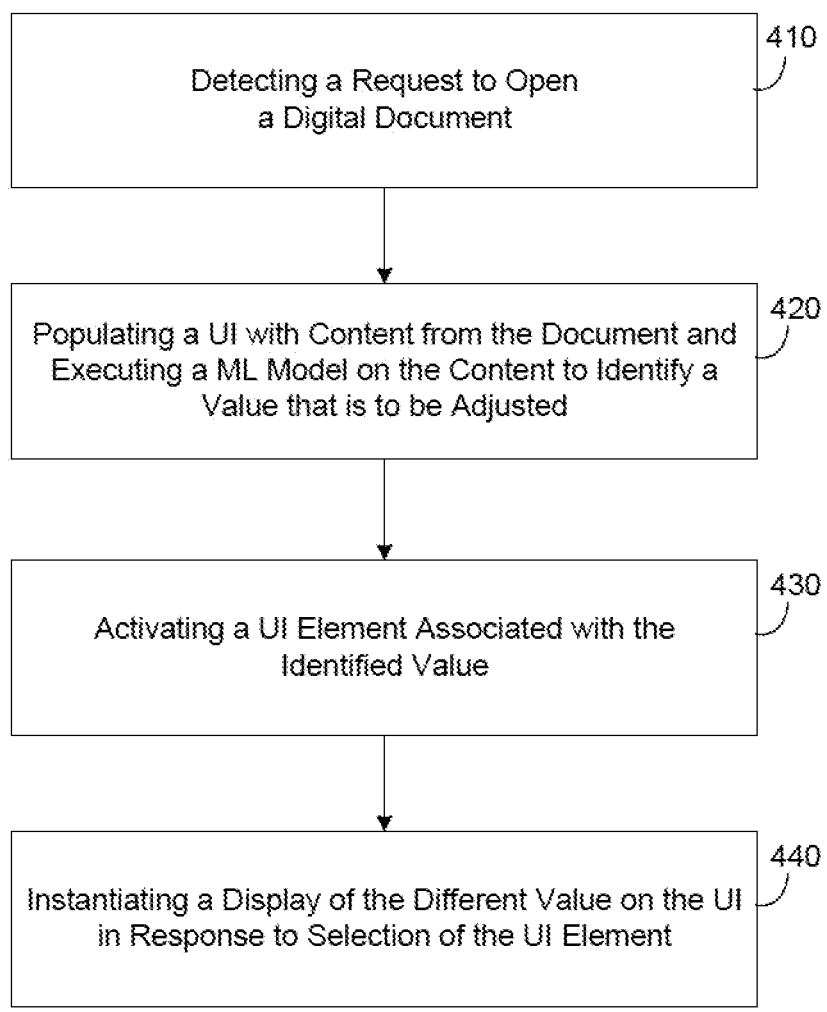

INTELLIGENT ADJUSTMENT OF DOCUMENTS VIA MACHINE LEARNING

BACKGROUND

Organizations that conduct business in a jurisdiction (e.g., a state, a country, etc.) are typically required by rules of the jurisdiction to provide documentation/reports that detail the organization's financial activities within the jurisdiction. The documents serve as proof that the organization is complying with the laws, including the tax laws. One such common example of reporting documents are value-added tax (VAT) documents, which are commonly found in jurisdiction all over the world including the European Union. When an organization conducts business in multiple jurisdictions, that organization must submit separate reports/document to each of the jurisdictions based on the different reporting requirements of those jurisdictions. Keeping track of the subtle nuances of the different tax laws among the different jurisdictions can be a daunting task. Typically, such a task is performed by a human. When the organization has to comply with multiple jurisdictions, the organization usually needs multiple people/services to provide the documentation in the jurisdictions.

In some cases, an organization may rely on a software application to organize the documents for different jurisdictions. For example, a user may upload documents such as invoices, credit memos, debit memos, and the like, to be submitted for proof of compliance for accounting purposes. The software application is then used to build a digital report which can be submitted to satisfy reporting requirements, such as VAT requirements. Before the report is submitted, a user (such as an accountant) must go through the values within the report (possibly hundreds or even thousands) and verify that they are accurate. Even the smallest typo can lead to an error in reporting subjecting the organization to violation of rules and possible punishment.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIG. 1A is a diagram illustrating a process of training a machine learning model in accordance with an example embodiment.

FIG. 1B is a diagram illustrating a process of making a prediction via the trained machine learning model in accordance with an example embodiment.

FIGS. 2A-2F are diagrams illustrating a process of interacting with a digital document via a user interface in accordance with example embodiments.

FIG. 3 is a diagram illustrating a process of submitting a digital document that has been adjusted in accordance with example embodiments.

FIG. 4 is a diagram illustrating a method of adjusting digital documents in accordance with an example embodiment.

DETAILED DESCRIPTION

Figure 1C:
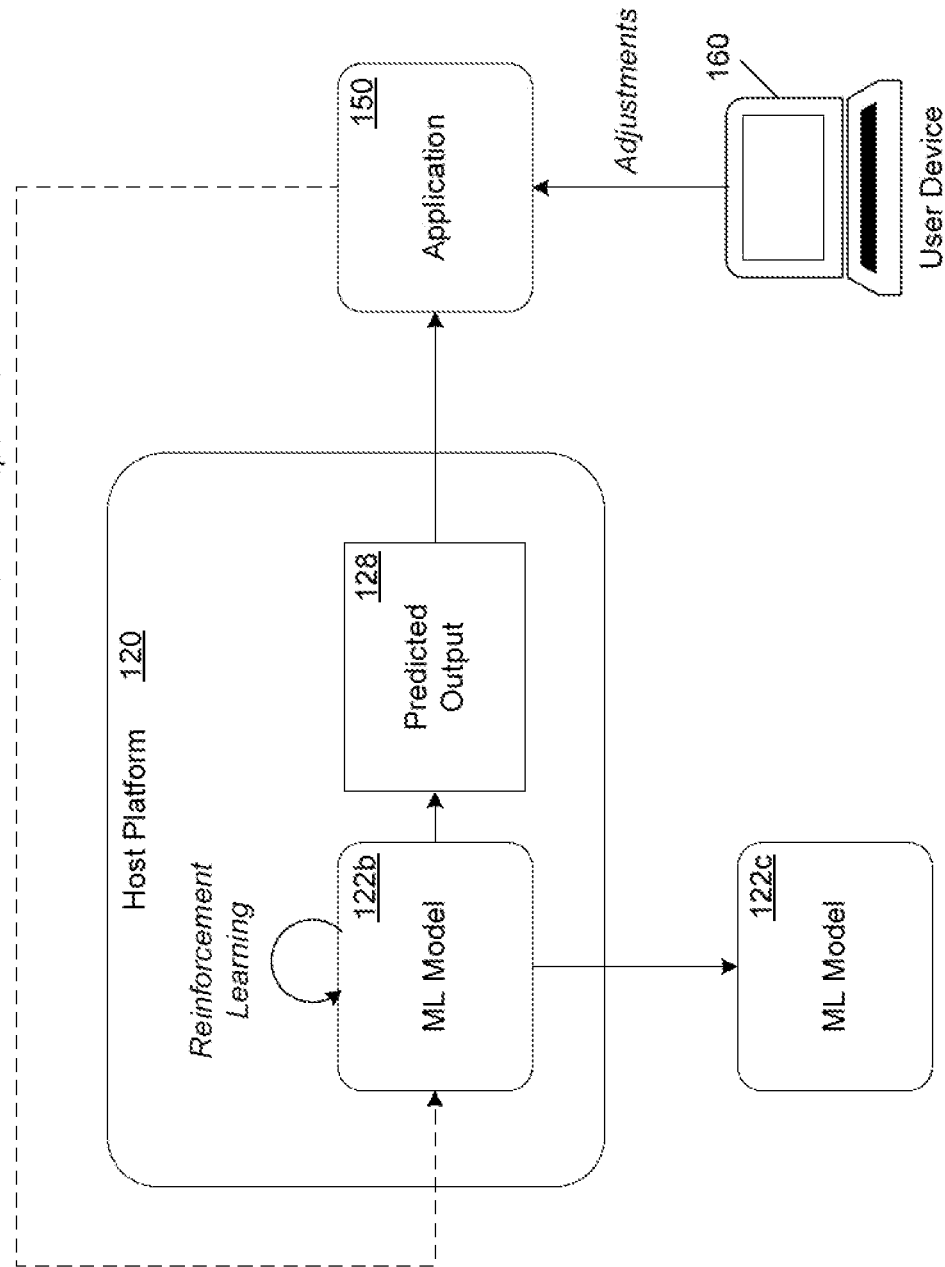
FIG. 1C is a diagram illustrating a process of performing reinforcement retraining on the machine learning model in accordance with an example embodiment.

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Organizations throughout the world create, generate, and submit compliance reports in to authorities/agencies along with documents required by the jurisdictions. The compliance reports are electronic reports (i.e., digital reports) that need to be transmitted electronically to a computing device of the authority via an electronic computer network. In the examples herein, a document refers to an electronic document (i.e., a digital document). The document may have a format of an eXtensible Markup Language (XML), a Portable Document Format (PDF), text file (TXT), JavaScript Object Notation (JSON), comma separated values (CSV), an eXtensible Business Reporting Language (XBRL), and the like. Before generating the reports, the user (e.g., accountant, etc.), may adjust one or more values within a report due to mistakes or inaccurate values being initially included in the report. Some of the reasons for changing values within fields of a report may due to an erroneous posting, an erroneous business process, incorrect document data, waiting for clarification from business partner, external source data is missing, data needs to be adjusted based on subsequently entered values, or the like.

The consequences of submitting incorrect reporting documents with an electronic report can expose an individual and an organization to potential violations of the compliance laws of a particular jurisdiction. Because of this, many organizations rely on accountants to manually review the values contained within the fields of the report on a line-by-line (or field-by-field) basis to ensure that the values are correct. This process is subject to a number of deficiencies and drawbacks. Depending on the size of the business there may be thousands of fields and values within the report which the accountant must look at to manually identify which fields need to be modified before creating the report. The process of identifying the incorrect values is manual and prone to errors. Searching through the list of fields/line items on the screen is also a time-consuming process.

The example embodiments are directed to a host system (e.g., a software application hosted on a server or other device) which overcomes the drawbacks of the traditional manual report adjustment process that is performed by a user. In some embodiments, the host system may already provide accounting services and reporting services for purposes of compliance. According to various embodiments, a self-learning system (e.g., a machine learning model, machine learning model ensemble, etc.) self-learns from historical adjustments of the user to values contained within fields of other reports. These historical adjustments may be input into the machine learning model during training and may be used to train the machine learning model to automatically recommend values to be adjusted on future reports. Thus, the machine learning model may be user-specific or organization-specific in that it is only trained based on data from a particular user or organization.

The host system described herein may automatically learn from past corrections made by a user/accountant by training itself based on historical adjusted attributes/fields which were made for a particular report in the past. The host system may also provide a user interface for accessing reports. Here, the software application may be a web-based application such as a progressive web application (PWA), a mobile application, or the like. A user may connect to the software application and open the user interface by opening a URI of an endpoint of the host platform which hosts the software application. The user can submit requests to view/open a particular report via the user interface. For example, the user may request a particular month/year and the host system may open such a report.

When generating the report, the host may execute a machine learning model based on the values contained within fields of the report (e.g., the content from the report that is being displayed on the user interface.) The model may identify a value/values in the report which are incorrect or different than the user normally uses and recommend an adjustment to the value/values based on historical changes to the value or other similar values learned by the machine learning model. The suggested adjustment may be based on a user's preferences with respect to a particular jurisdiction (associated with report), a particular business or product associated with the report, a particular month or time period, and the like. Thus, the host system can learn preferences of the user when reporting data. The adjusting can be performed within the report before the report is submitted to the respective tax authority. In some cases, the host system may suggest a range of recommended values that include an upper boundary and a lower boundary of a recommended value. By using a range, the host can suggest a broad adjustment, and the user can refine it by selecting a particular value within the range. Thus, the user can input their own desired value into the corresponding field after seeing the suggested range from the system. As another example, the system may display a single recommended value. In this case, the user may simply press a button on the screen to trigger the host system to automatically accept the recommended change.

The host system can provide recommendations to change specific fields/values within the report via the user interface which provides the user/accountant the ability to make an informed decision about which attributes require more attention and make the changes accordingly before document/report submission. To assist the user, the host system may also generate and display a trend analysis of previous reporting periods per year for each of the amount fields based on historical data of the identified value stored in a database table dedicated to the report and/or the value. This additional information enables the user to visualize a trend of change in the value from one or more previous reporting periods.

The host system may display a warning or indicator next to the field that contains the incorrect value that needs to be changed. For example, the host system may highlight a border/box around the field within the report displayed within the user interface that contains the identified value (i.e., the value to be adjusted/corrected, etc.) determined by the machine learning model. The highlight may include bolding the outer boundary of the field or adding color/shading around the outer boundary. In addition or in the alternative, the recommended value (or range of values) for the field may be displayed directly above, below, or adjacent/to the field of the report within the user interface where the identified value is contained. The system may also provide a recommendation percentage on what the value should be. With this insight the user knows that certain attributes require attention, and changes might be needed.

When the host platform determines an adjustment is likely needed, the host platform may activate an icon or other user interface element that is displayed next to or otherwise in association with the field on the user interface. The activated user interface element may be linked to a menu or other user interface element with a smaller display area than the user interface such as a pop-up window, etc. with additional details about the recommended value (i.e., the different value that the machine learning model recommends) The recommendations can be provided to a user along via the user interface with an option for automatically implementing the changes.

According to various embodiments, the host system may also generate and display an interactive user interface with content items that are activated based on which values within the user interface are suggested for adjustment. For example, the host system may display an activated user interface element (such as an icon or image) next to each field in the report with a recommended change. The displayed recommendation may include a suggested range of data values which allows the user to choose a value (e.g., from a value within the range, etc.) and input the value via the user interface. In addition, the host system may activate or otherwise initialize a display of an input field next to the range of suggested values which enables the user to use an input mechanism such as a keyboard, mouse, pointer, menu, etc. to enter a selected value (e.g., from within the suggested range, etc.). In addition, details such as trend analysis, and additional information may be provided within the user interface such as a sub-menu of the user interface. When a user clicks on and interacts with features within the user interface, the host may display additional details about the recommended range of values including the trend analysis and possibly other options such as a link to a trend analysis for the value.

The value(s) dynamically entered into the input field(s) of the user interface may be captured by the host system. Furthermore, the host system may automatically modify the underlying database tables/storage to reflect the newly entered value(s).

In addition, in some embodiments, the host system may log data from manual adjustments performed by a user and use the logged changes to train the machine learning model. As another example, the system may auto-recommend adjustments to a report displayed within a user interface via activated UI elements within the user interface. The user may enter new value(s) to adjust the values which the host system/machine learning model recommends for adjustment. In response, the host system may log both the recommend adjustments and the user's decision with respect to the adjustments via a log file. The log file can then be used to re-train the machine learning model thereby performing reinforcement learning based on the system's own data.

FIGS. 1A-1C are diagrams illustrating a host environment such as a cloud platform, a web server, or other runtime environment which hosts a software application as described herein. In these examples, FIG. 1A illustrates a process 100 of training a machine learning model in accordance with an example embodiment, FIG. 1B illustrates a process 140 of executing a prediction via the trained machine learning model in accordance with an example embodiment, and FIG. 1C illustrates a process 180 of performing reinforcement retraining on the machine learning model based on the prediction and a user interaction in accordance with an example embodiment.

Referring to FIG. 1A, a host platform 120 is shown which includes a development environment, for example, an integrated development environment (IDE) or the like where machine learning models can be developed. The host platform 120 may include an application server, a web server, a mobile application host server, a database, a cloud platform, an on-premises server, and the like. The host platform 120 may receive a training data set 110 with historical adjustments to documents (such as reports for tax purposes and the like, etc.) within respective reporting periods. Here, the training data set 110 may include line items representing the adjusted values along with an identifier of the fields. For example, each line item may represent a different field in a report and includes an original value and a adjusted/corrected value for the original value.

According to various aspects, the host platform 120 may train the machine learning model 122a based on historical data of values that have already been adjusted by the user which are stored within the training data set 110. The machine learning model 122a learns over a period and derives the rules that can be used to predict an expected value of a field for a future reporting period. The system then presents a predicted output set 124 to a developer 130 via a user interface 126. If approved, the host platform 120 may transfer a machine learning model 122b to a live execution environment.

The training process may be repeated a number of times and debriefed by the host platform 120 to provide the developer 130 with an understanding of the variables and aspects of the model that are affected by the training. When the developer 130 accepts the model, the developer 130 may use the user interface 126 to transfer the machine learning model 122b from the learning environment to a live runtime environment hosted by the host platform 120.

Referring now to FIG. 1B, the machine learning model 122b is running in a live runtime environment of the host platform 120. Here, the machine learning model 122b may be incorporated into a software application 150 or suite of applications such as accounting software, enterprise resource planning (ERP) software, or the like. A user may use a user device 160 to connect to and interact with the software application 150 causing the software application to call (e.g., via an API call, etc.) the machine learning model 122b to make a prediction based on document data included within reporting periods of the software application 150. Here, the user device 160 may connect to the host platform 120 via the Internet and consume the software application 150 via a mobile application, web application, or the like. Next, the user may send a request to the software application 150 to open an existing report. The software application 150 may open a display of the report on a user interface that is open on the user device 160 and also send content from the report (e.g., values within the report) to the machine learning model 122b.

According to various embodiments, the machine learning model 122b may receive the report data/content from the software application 150 and recommend an adjustment to a value or values within the report for a particular reporting period of the software application 150. The input data may include document data such as a list of documents of a current reporting period and/or documents from one or more other reporting periods, the values within the documents, and the like. The input data may be provided with the API call from the software application 150 or some other submission. In response, the host platform 120 may execute the machine learning model 122b on the input data to create a predicted output 128 that includes one or more recommended adjustments to one or more values within the report. In addition, the predicted output 128 may include a prediction confidence of each adjustment. The predicted output 128 may be transmitted to the software application 150 for display to the user.

The designed system provides the user device 160 with a user interface that allows the user to accept the predicted output 128. For example, the user may enter a new value into the field of the report within the user interface based on the recommended value. As another example, the user may click on a button or other selection within the user interface which auto-selects the recommended value in place of the original value. The software application 150 may be used by the user to accept/reject the auto-recommended adjustments. Any changes accepted by the user may be updated within a database table 154 or other data record assigned to the document/field within the software application 150 via an update service 170. For example, the update service 170 may update table data, document data, or the like, stored within the database tables 154. The updates may include updating the original value stored within the field of the report with the adjusted value. The field may include a unique ID and it may be paired with the corresponding value (e.g., the original value or the adjusted value) within the database table.

In addition to the updates, the software application 150 may also provide a trend analysis to the user via the user interface. The trend analysis may be created aby a trend analysis software module 152. The trend analysis may be used to generate a trend graph of a value for a previous number of reporting periods (e.g., 4 years, etc.). The graph may be displayed on the user interface where the adjustments are being made to the document. Thus, the user may have a further understanding/education of the reason for the change.

Referring to FIG. 1C, there is a process 180 of reinforcement learning. Here, the adjustments that are accepted by the user in the process 140 of FIG. 1B, may be used to re-train the machine learning model 122b to create a reinforced model 122c. For example, an original value, a recommended adjusted value, and a user's decision to approve/disapprove of the recommended adjusted value over the original value may be included in the training data that is used to retrain the machine learning model 122b.

Figure 2B:
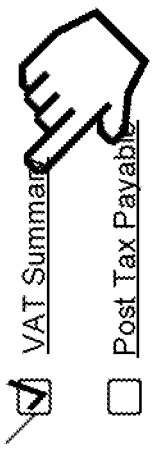

FIGS. 2A-2F illustrate a process of interacting with a digital document via a user interface in accordance with example embodiments. For example, FIG. 2A illustrates a process 200 of a user using a user device 220, such as a smartphone, tablet, desktop computer, smart-wearable, laptop, or the like, to connect to a host platform 210 via a network such as the Internet to establish a secure communication channel. In this example, the host platform 210 may host a software application described herein such as a mobile application, a progressive web application, a locally-installed application, or the like.

The user may use the user device 220 to establish a secure/authenticated channel for communication between the user device 220 and the host platform 210 (e.g., between a web browser running on the user device 220 and a back-end application hosted by the host platform 210, etc.) In this example, the user may login or enter access credentials into a user interface being output by the host platform 210 (e.g., via a URL, etc.) to verify their identity. For example, the user may input text content, biometrics, speech commands, gestures, or the like, to establish a security session between the host platform 210 and the user device 220. Once established, the host platform 210 may identify the user's information, for example, the username, password, or the like. Here, the user may request to open a report such as a tax-based report (e.g., one or more VAT documents, etc.) In response, the host platform 210 may populate the user interface with content of the report such as fields, values within the fields, names of the fields, document data, client data, etc.

FIG. 2B illustrates a user interface 230 that may be output by the host platform 210 in response to the user successfully logging into the software application on the host platform 210. For example, the user interface 230 may be instantiated or populated within a web browser or mobile application on the user device 220 based on an output by the host platform 210. In FIG. 2B, the user interface 230 includes a column 232 of activities that are to be performed and that may be embodied as interactive elements within the user interface such as links, buttons, boxes, or the like. The activities may correspond to different activities to be completed for a reporting period, etc. The reporting periods may correspond to reporting periods for compliance, tax purposes, accounting, and the like. In some cases, the reporting periods may be weekly, monthly, quarterly, or the like. Within these reporting periods, the organization may be required to submit a number of documents. Here, the user interface 230 may also include other data attributes of each activity such as due date, status (e.g., started, completed, not started, etc.), identifiers of the user who last modified the document, when the document was last modified, and the like.

In FIG. 2B, the user uses a cursor to select an activity identifier 234 corresponding to a VAT summary document. In response to the activity identifier 234 being selected, the host platform 210 may open or otherwise navigate to a respective page of the software application that includes the content (report content) of the activity. For example, the host platform 210 may display a list of attributes such ad a list of documents, search criteria, document logs, and the like, as shown in the user interface 240 shown in FIG. 2C.

Referring to FIG. 2C, the user interface 240 includes details of documents associated with the activity with respect to a current reporting period as shown under the document tab 241 in the user interface 240. In this example, a document 242 is shown with details about the document including a format or type, a size, and the like. In addition, the system may display an indicator 243 about the document status (e.g., complete, incomplete, processing, not started, etc.) and a notification 244 of recommended adjustment(s). In this example, the notification 244 of recommended adjustments is dynamically activated by the host system. That is, the notification 244 may only be activated when the host detects recommended adjustments. If no recommended adjustments are detected, the host may not activate the notification 244 or may cross it out or otherwise discolor or disable it.

The user interface 240 also includes a selection criteria tab 245 with a code value 246 and a reporting due date value 247 that were used to find the report. The user interface 240 also includes a log 248 with timestamps 249 of logged activity and messages 250 describing the actions performed within the logged activity. In this example, the user selects the document 242 for display and then selects a submit button 251. In response, the system may open a user interface 260A shown in FIG. 2D. In this example, the user interface 260A includes a list of field names 261 and fields 262 arranged adjacent to the field names 261 and corresponding thereto. The fields 262 are filled with content/values that are originally or currently existing within the report/document.

In addition to opening the user interface 260A, the host platform 210 may execute or call a machine learning model such as machine learning model 122b described in FIG. 1B, to predict one or more values within one or more of the fields 262 of the report that are to be adjusted. In this case, the host detects that fields for Net Income and Tax Amount are to be adjusted. Here, the host may activate/initiate a display of an interactive element 263 next to the Net Income field within the user interface 260A to indicate that there is a recommended adjustment for this field. Likewise, the host may activate/initiate a display of a similar/common interactive element 264 next to the Tax Amount field within the user interface 260A. In addition, the user interface 260A includes a save/regenerate button 265 to save any changes to the document that are performed via the user interface 260A and a cancel button 266 to cancel any changes.

FIG. 2E illustrates a user interface 260B in which the user has selected the interactive element 264 on the user interface 260A causing a menu area 270 to be initiated and displayed. For example, the menu area 270 may pop-down from the field where the value to be adjusted/corrected is stored to focus the user's attention on exactly which value is to be changed and by what alternative value. In this case, the menu area 270 includes an identifier of the type of value 271 to be corrected and a suggested amount 272 which in this case is a range but it could be a single value or multiple values. With the range value, the user may manually modify the value to include an amount of the user's chosen, given the recommendation in the ranges of values. The menu area 270 also includes a trend analysis link 273.

In this case, the user can "activate" a display of the menu area 270 by selecting on the interactive element 264 that is dynamically activated based on the results of the machine learning. That is, the fields that have activated interactive elements are the fields with values that the machine learning model recommends adjustments for. Meanwhile, for field where no adjustments are recommended, the host may do nothing. In other words, the display area around these fields within the user interface 260B does not change.

Figure 2F:
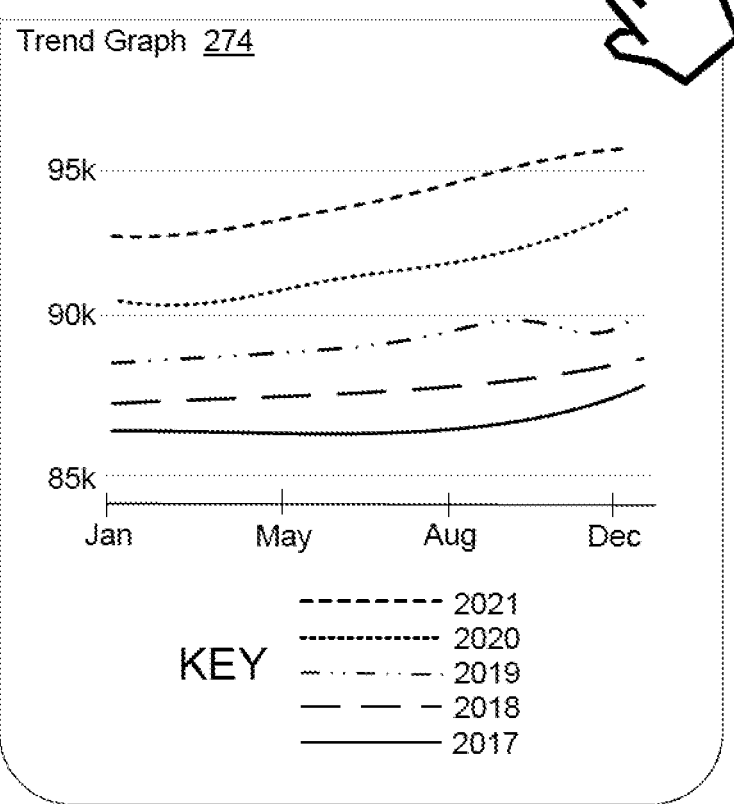

FIG. 2F illustrates a user interface 260C after the user has selected the trend analysis link 273 shown in the user interface 260B. Here, the host system opens (e.g., slides down, etc.) a trend graph 274 with a trend analysis of the value within the field (Tax Amount) over the past five years include the predicted year for 2021. The trend is measured over one year in various intervals/periods such as monthly, quarterly, or the like. This trend analysis can be used by the user to confirm the recommended adjustment by the host system.

The user may continue to interact with various interactive elements and make adjustments to the data within the document. When the user has finished making changes to the document, the document can be saved (e.g., via the save/regenerate button) and the updated document can be submitted to a reporting agency.

FIG. 3 illustrates a process 300 of submitting a digital document that has been adjusted in accordance with example embodiments. Referring to FIG. 3, a user may access a software application described herein which is hosted by a host platform 320 via a user device 310. The user may open the application by navigating to a webpage or opening a mobile application and viewing a user interface of the application hosted by the host platform 320. In response, the host platform 320 may provide a display of report content and also recommended changes to one or more values within the report. Any changes may be input to the software application in 301 and used to regenerate the digital document/report.

In 302, the host platform 320 may establish a secure/authenticated communication channel with a reporting service 330, such as a tax reporting service or agency. Here, the authentication may be between the user on the user device 310 and the reporting service 330 via the host platform 320. The user may input access credentials and documentation to provide proof of authentication. In 303, with the authenticated channel setup, the host platform 320 may submit the adjusted document/report to the reporting service 330. For example, the host platform 320 may submit the report in response to a press of a button or other selection by the user via the user interface of the software application. As another example, the host platform 320 may submit the report at a predetermined interval of time, such as at the end of the month, or the like.

FIG. 4 illustrates a method of adjusting digital documents in accordance with an example embodiment. As an example, the method 400 may be performed by a cloud platform, a web server, an on-premises server, a user device, a database, a combination of devices, and the like. Referring to FIG. 4, in 410, the method may include detecting a request to open a digital document from a user via a user interface. For example, the user may be accessing the user interface via a web browser on a user device or a mobile application on the user device. The host may be connected to the user device via the Internet or other network. The digital document may be a report such as a tax report or the like. The digital document may be in a predetermined format/form.

In 420, the method may include populating the user interface with content from the digital document and executing a machine learning model on values within the content from the digital document, wherein the machine learning model identifies a value among the values that is to be adjusted to a different value based on previous adjustments by the user to previous reports. In 430, the method may include activating a user interface element within the user interface that is associated with the identified value within the content from the digital document on the user interface, wherein the user interface element indicates a recommended adjustment is available. In 440, the method may include, in response to a selection of the user interface element, instantiating a display of the different value on the user interface.

In some embodiments, the activating may further include storing a link between the user interface element and a display menu, wherein the instantiating comprises instantiating a display of the display menu with the different value therein based on the link, in response to the selection of the user interface element. In some embodiments, the different value may include a range of values that are output by the machine learning model and which are displayed under a field of the identified value within the content displayed within the user interface. In some embodiments, the instantiating may further include instantiating a display of a link to a trend analysis on the user interface in response to the selection of the user interface element.

In some embodiments, the instantiating may include displaying a graph that visualizes a trend of the identified value over time via the user interface in response to selection of the link to the trend analysis. In some embodiments, the activating may include displaying a user interface element next to a field of the identified value within the user interface, and highlighting the field of the identified value within the user interface. In some embodiments, the method may further include detecting a selection of an acceptance of the different value via the user interface, changing a display of the identified value to the different value within the user interface, and changing the identified value to the different value in a database table of the digital document. In some embodiments, the method may further include submitting the digital document with the different value to a host system via a computer network.

Figure 5:
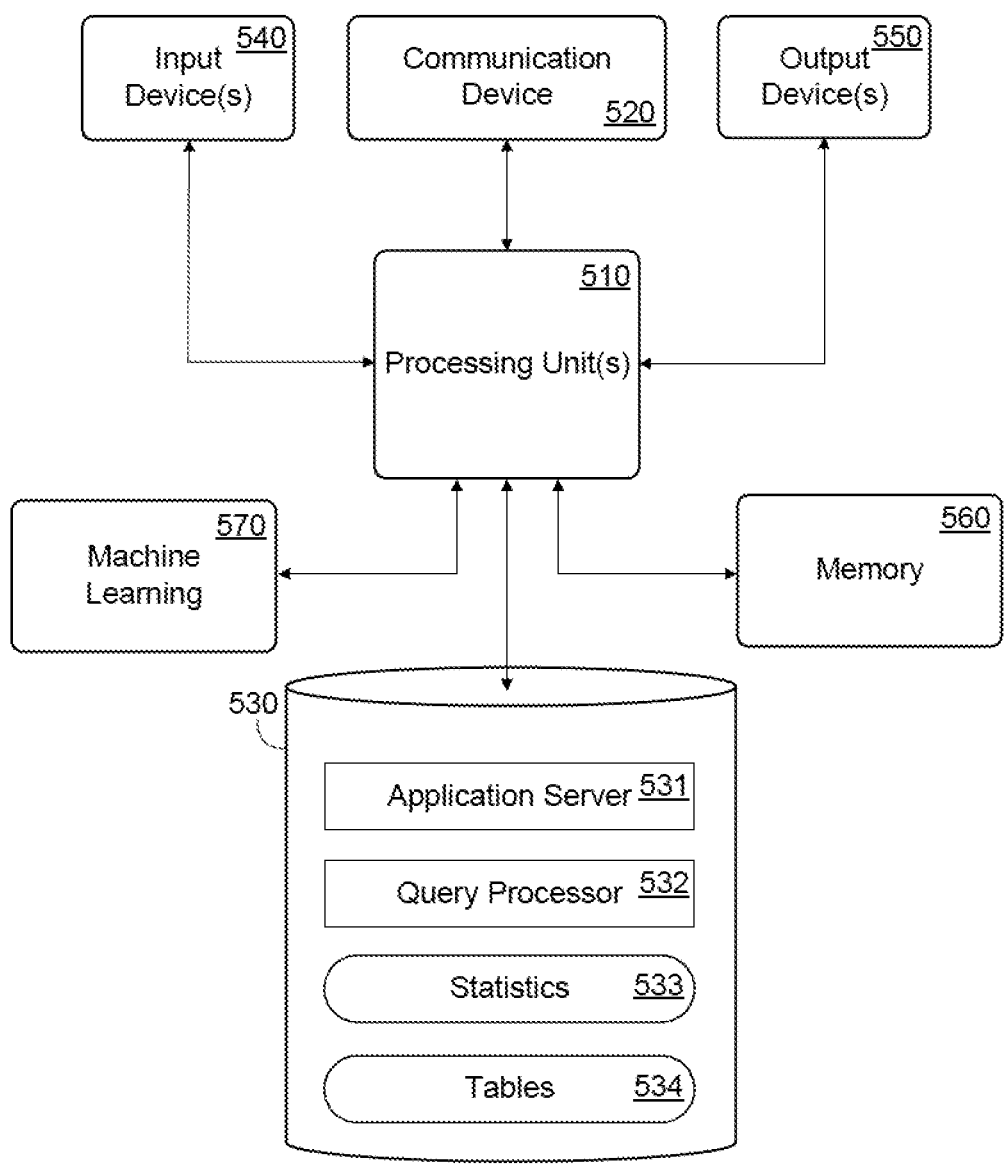
FIG. 5 is a diagram illustrating a computing system for use with any of the examples herein in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

FIG. 5 is a diagram of a server node 500 according to some embodiments. The server node 500 may include a general-purpose computing apparatus and may execute program code to perform any of the functions described herein. For example, the server node 500 may be host to the reporting software application described herein. The server node 500 may include an implementation of a remote terminal or a host platform such as an application server, in some embodiments. It should also be appreciated that the server node 500 may include other elements that are not depicted in the drawing and may not include all of the elements shown in the drawing. The server node 500 may perform the method 400 shown in FIG. 4.

Server node 500 includes processing unit(s) 510 (i.e., processors) operatively coupled to communication device 520, data storage device 530, input device(s) 540, output device(s) 550, and memory 560. Communication device 520 may facilitate communication with external devices, such as an external network or a data storage device. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into the server node 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM). In some embodiments, the data storage device 530 may store user interface elements in tabular form. For example, one or more columns and one or more rows of user interface elements may be displayed in a two-dimensional spreadsheet, table, document, digital structure, or the like.

Application server 531 and query processor 532 may each comprise program code executed by processing unit(s) 510 to cause server node 500 to perform any one or more of the processes described herein. Such processes may include displaying user interfaces and activating/deactivating user interface elements as described herein. As another example, the query processor 532 may query underlying statistics 533 and tables 534 of data such as input data for the machine learning model described herein and input the returned data into the model. Embodiments are not limited to execution of these processes by a single computing device. In some embodiments, the data storage device 530 may also store data and other program code for providing additional functionality and/or which are necessary for operation of server node 500, such as device drivers, operating system files, etc.

According to various embodiments, the server node 500 may also store one or more machine learning models via a machine learning service 570. The machine learning service may be called by the processing unit(s) 510 to perform a prediction based on input data that is retrieved from the memory 560, the data storage device 530, or any other device including a user interface displayed by the processing unit(s) 510. The machine learning service 570 may predict whether a value assigned to a report/reporting period of a software application should be adjusted. If a user accepts such recommendations, the processing unit(s) 510 may adjust the documents within the software application.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to
identify changes that are made to a digital document to fulfill reporting requirements and record the changes in a log;
train a machine learning model to learn values that are normally used within the digital document to fulfill the reporting requirements via execution of the machine learning model on the identified changes that are recorded in the log;
detect a request to open an instance of the digital document via a user interface;
populate the user interface with content from the instance of the digital document and execute the machine learning model on values within the digital document, wherein the machine learning model identifies a value within the instance of the digital document that is not normally used to fulfill the reporting requirements based on the learned values that are normally used to fulfill the reporting requirements;
activate a user interface element within the user interface that is associated with the identified value within the content from the instance of the digital document on the user interface, wherein the user interface element indicates a recommended adjustment is available; and
in response to a selection of the user interface element, instantiate a display of a different value on the user interface to recommend in place of the identified value based on values that are normally used to fulfill the reporting requirements within the digital document, wherein the different value comprises a range of values that are output by the machine learning model and which are displayed under a field of the identified value within the content displayed within the user interface.

2. The computing system of claim 1, wherein the processor is configured to store a link between the user interface element and a display menu, and instantiate a display of the display menu with the different value therein based on the link, in response to the selection of the user interface element.

3. The computing system of claim 1, wherein the processor is further configured to instantiate a display of a link to a trend analysis on the user interface in response to the selection of the user interface element.

4. The computing system of claim 3, wherein the processor is configured to display a graph that visualizes a trend of the identified value over time via the user interface in response to selection of the link to the trend analysis.

5. The computing system of claim 1, wherein the processor is configured to display the user interface element next to a field of the identified value within the user interface, and highlight the field of the identified value within the user interface.

6. The computing system of claim 1, wherein the processor is further configured to detect a selection of an acceptance of the different value via the user interface and change a display of the identified value to the different value within the user interface and change the identified value to the different value in a database table of the digital document.

7. The computing system of claim 6, wherein the processor is further configured to submit the digital document with the different value to a host system via a computer network.

8. A method comprising:
identifying changes that are made to a digital document to fulfill reporting requirements and record the changes in a log;
training a machine learning model to learn values that are normally used within the digital document to fulfill the reporting requirements via execution of the machine learning model on the identified changes that are recorded in the log;
detecting a request to open an instance of the digital document via a user interface;
populating the user interface with content from the instance of the digital document and executing the machine learning model on values within the digital document, wherein the machine learning model identifies a value within the instance of the digital document that is not normally used to fulfill the reporting requirements based on the learned values that are normally used to fulfill the reporting requirements;
activating a user interface element within the user interface that is associated with the identified value within the content from the instance of the digital document on the user interface, wherein the user interface element indicates a recommended adjustment is available; and
in response to a selection of the user interface element, instantiating a display of a different value on the user interface to recommend in place of the identified value based on values that are normally used to fulfill the reporting requirements within the digital document, wherein the different value comprises a range of values that are output by the machine learning model and which are displayed under a field of the identified value within the content displayed within the user interface.

9. The method of claim 8, wherein the activating further comprises storing a link between the user interface element and a display menu, wherein the instantiating comprises instantiating a display of the display menu with the different value therein based on the link, in response to the selection of the user interface element.

10. The method of claim 8, wherein the instantiating further comprises instantiating a display of a link to a trend analysis on the user interface in response to the selection of the user interface element.

11. The method of claim 10, wherein the instantiating comprises displaying a graph that visualizes a trend of the identified value over time via the user interface in response to selection of the link to the trend analysis.

12. The method of claim 8, wherein the activating comprises displaying a user interface element next to a field of the identified value within the user interface, and highlighting the field of the identified value within the user interface.

13. The method of claim 9, wherein the method further comprises detecting a selection of an acceptance of the different value via the user interface, changing a display of the identified value to the different value within the user interface, and changing the identified value to the different value in a database table of the digital document.

14. The method of claim 13, wherein the method further comprises submitting the digital document with the different value to a host system via a computer network.

15. A non-transitory computer-readable medium comprising program instructions which when executed by a processor cause a computer to perform a method comprising:
identifying changes that are made to a digital document to fulfill reporting requirements and record the changes in a log;
training a machine learning model to learn values that are normally used within the digital document to fulfill the reporting requirements via execution of the machine learning model on the identified changes that are recorded in the log;
detecting a request to open an instance of the digital document via a user interface;
populating the user interface with content from the instance of the digital document and executing the machine learning model on values within the digital document, wherein the machine learning model identifies a value within the instance of the digital document that is not normally used to fulfill the reporting requirements based on the learned values that are normally used to fulfill the reporting requirements;
activating a user interface element within the user interface that is associated with the identified value within the content from the instance of the digital document on the user interface, wherein the user interface element indicates a recommended adjustment is available; and
in response to a selection of the user interface element, instantiating a display of a different value on the user interface to recommend in place of the identified value based on values that are normally used to fulfill the reporting requirements within the digital document, wherein the different value comprises a range of values that are output by the machine learning model and which are displayed under a field of the identified value within the content displayed within the user interface.

16. The non-transitory computer-readable medium of claim 15, wherein the activating further comprises storing a link between the user interface element and a display menu, wherein the instantiating comprises instantiating a display of the display menu with the different value therein based on the link, in response to the selection of the user interface element.

17. The non-transitory computer-readable medium of claim 15, wherein the instantiating further comprises instantiating a display of a link to a trend analysis on the user interface in response to the selection of the user interface element.

* * * * *